United States Patent [19]

Yant

[11] Patent Number: 5,105,922
[45] Date of Patent: Apr. 21, 1992

[54] HYDRAULIC CLUTCH AND TRANSMISSION ACTUATING SYSTEM

[75] Inventor: Kenneth B. Yant, Oregon, Ohio

[73] Assignee: Dana Corporation, Toledo, Ohio

[21] Appl. No.: 678,728

[22] Filed: Apr. 1, 1991

[51] Int. Cl.⁵ .......................................... F16D 25/14
[52] U.S. Cl. .................................. 192/3.58; 192/85 R
[58] Field of Search ..................... 192/3.58, 3.57, 85 R

[56] References Cited

U.S. PATENT DOCUMENTS

| | | | |
|---|---|---|---|
| 3,756,358 | 9/1973 | Espenschied et al. | 192/0.09 |
| 4,275,804 | 6/1981 | Szarka et al. | 192/3.58 |
| 4,535,879 | 8/1985 | Sturges | 192/52 |
| 4,543,856 | 10/1985 | Klatt | 192/3.58 X |
| 4,558,772 | 12/1985 | Grimes et al. | 192/0.076 |
| 4,560,044 | 12/1985 | Nagata | 192/52 X |
| 4,591,038 | 5/1986 | Asagi et al. | 192/0.073 |
| 4,627,312 | 12/1986 | Fujieda et al. | 74/866 |
| 4,629,045 | 12/1986 | Kasai et al. | 192/3.58 X |
| 4,632,231 | 12/1986 | Hattori et al. | 192/0.076 |
| 4,632,234 | 12/1986 | Bardoll et al. | 192/3.58 |
| 4,700,819 | 10/1987 | Nishikawa et al. | 192/3.58 X |
| 4,838,397 | 6/1989 | Kurihara et al. | 192/3.58 X |
| 4,936,430 | 6/1990 | Shikata | 192/3.58 |
| 4,991,099 | 2/1991 | Markyvech et al. | 364/424.1 |
| 5,035,312 | 7/1991 | Asayama et al. | 192/85 R |

Primary Examiner—Leslie A. Braun
Assistant Examiner—Andrea Pitts
Attorney, Agent, or Firm—MacMillan, Sobanski & Todd

[57] ABSTRACT

A hydraulic actuating system for disengaging a clutch, shifting gears in a transmission and reengaging the clutch for a vehicle. An electric pump delivers hydraulic fluid under pressure to an accumulator. High and low pressure switches control operation of the pump to maintain the hydraulic fluid pressure within a desired range, while limiting operating time of the pump and minimizing energy waste. The pressurized fluid from the accumulator is applied through valves to operate a clutch actuating mechanism and to shift transmission gears. A secondary accumulator is provided at the clutch actuating mechanism to provide smoother clutch reengagement with a low cost valve having a relative coarse modulation capacity.

7 Claims, 1 Drawing Sheet

HYDRAULIC CLUTCH AND TRANSMISSION ACTUATING SYSTEM

TECHNICAL FIELD

The invention relates to hydraulic actuating systems and more particularly to a hydraulic actuating system for disengaging a clutch, for shifting gears in a vehicle transmission and for reengaging the clutch.

BACKGROUND ART

In recent years, there has been an increased interest in an automatic manual transmission for medium duty and heavy duty trucks, for example. An automatic manual transmission differs from the automatic transmission used in automobiles in that it has a positive clutch which when engaged has no slippage. The standard automatic transmission used in automobiles has some torque transfer loss and provides less than optimal vehicle mileage when compared to a clutch and a manual transmission operated by a skilled operator. In an automatic manual transmission, like the manual transmission, the clutch is disengaged to disconnect the motor from the transmission prior to shifting gears, the gears are shifted through movement of one or more levers, and the clutch is reengaged. Only with the automatic manual transmission the clutch and the gear shifting mechanism are operated with a hydraulic system and a gear shift controller.

The clutch and transmission shifting mechanism may be operated by pressurized hydraulic fluid. The hydraulic fluid pressure is obtained from a pump which is constantly driven by the vehicle motor. A pressure regulating valve is needed to maintain a desired fluid pressure over a range of pump speeds. Since the pump is constantly driven against the back pressure of the pumped fluid, there is a continuous energy loss in the system.

The clutch may be operated by a hydraulic cylinder and two solenoid actuated valves. To disengage the clutch, one valve is opened to deliver pressurized fluid to the clutch actuating cylinder The fluid pressure moves a piston which disengages the clutch to disconnect the vehicle motor from the transmission. When the clutch is to be reengaged, a second valve is opened to dump fluid from the clutch actuating cylinder. Various techniques have been suggested to provide a smooth reengagement which gradually brings the clutch output shaft up to the speed of the motor drive shaft Ideally, clutch reengagement is similar to the reengagement of a manual clutch by a skilled operator's foot.

According to one known technique, an expensive precision valve has been used for the second valve and the second valve is pulse width modulated to accurately control venting of fluid from the clutch actuating cylinder. A small volume of fluid is vented from the cylinder each time the valve is pulsed. The volume flow through the valve for each modulation step must be sufficiently low to require a number of modulation steps between the point that the clutch friction plates are just touching or "kissing" to when the clutch is fully engaged to produce a smooth clutch engagement. According to U.S. Pat. No. 4,535,879, the duty cycle of the pulse width modulation may be varied to provide the desired smooth clutch reengagement. According to another technique described in U.S. Pat. No. 4,533,030, a valve initially vents the clutch actuating cylinder to a control cylinder having an intermediate pressure to partially release the pressure in the cylinder and accordingly to partially reengage the clutch. Subsequently, the cylinder is fully vented by a throttle controlled valve and a bleed orifice to fully engage the clutch. U.S. Pat. No. 4,560,044 shows a valve system which provides an initial rapid fluid flow to a piston until a predetermined pressure is reached. The rate of fluid flow to the piston then is limited by diverting a portion of the flow to an accumulator to provide a more gradual fluid pressure increase until the clutch friction plates initially contact to slow the increase in pressure between the friction plates Subsequently, the fluid pressure is rapidly increased to complete the clutch engagement without slippage. A sophisticated valving arrangement is required to control the flow of fluid to the clutch piston.

DISCLOSURE OF INVENTION

According to the present invention, an improved low cost hydraulic system is provided for operating a clutch and a gear shifting mechanism in an automatic manual vehicle transmission. Hydraulic fluid pressure is supplied by an electric motor driven pump The pump capacity and the primary accumulator capacity allow the pump to be operated at a low duty cycle, preferably at a duty cycle of about 20% or less during maximum fluid consumption by the clutch and the shifting mechanism. The pump is connected to a primary accumulator. Fluid pressure sensing switches turn the pump motor on when the fluid pressure drops below a predetermined low pressure and turn the pump motor off when the fluid pressure reaches a predetermined high pressure. The primary accumulator supplies the pressurized fluid for operating the clutch and the transmission gear shifting mechanism.

A first solenoid actuated valve is connected to deliver pressurized fluid from the primary accumulator to the cylinder to disengage the clutch. At the same time the clutch is disengaged, an additional volume of fluid flows into a secondary accumulator. The secondary accumulator includes a spring and a piston which are moved in a cylinder by a predetermined fluid pressure less than the hydraulic fluid pressure from the primary accumulator. Preferably, this predetermined pressure is equal to the minimum pressure required to disengage the clutch with the clutch plates just lightly touching. A second solenoid actuated valve is connected to simultaneously vent both the cylinder and the secondary accumulator when opened. When the clutch is to be reengaged, the second valve is pulse width modulated to control venting the cylinder and the secondary accumulator. Because of the added fluid volume in the accumulator and the fact that fluid from the accumulator is not vented until higher pressure fluid is vented from the clutch cylinder, the second valve may be a relatively coarse valve of less precision and of a lower cost than prior art valves for similar applications. When the clutch is being reengaged, there is an initial rapid pressure decrease to the predetermined pressure of the secondary accumulator and the actuator piston moves a relatively large distance until the friction plates touch and just begin to transfer energy to the transmission. A small further movement of the piston totally engages the clutch. By increasing the fluid volume with the secondary accumulator and by providing the secondary accumulator with a lower spring rate than the normal pressure from the primary accumulator, more steps or valve pulses are required to reengage the clutch and a smoother transfer of clutch plate load is achieved, which is more like the operation of a skilled operator's foot.

Accordingly, it is an object of the invention to provide an improved hydraulic system for operating a clutch and a gear shifting mechanism in a vehicle transmission.

Other objects and advantages of the invention will be apparent from the following detailed description of a preferred embodiment thereof and the accompanying drawing.

BEST MODE FOR CARRYING OUT THE INVENTION

Figure 1:
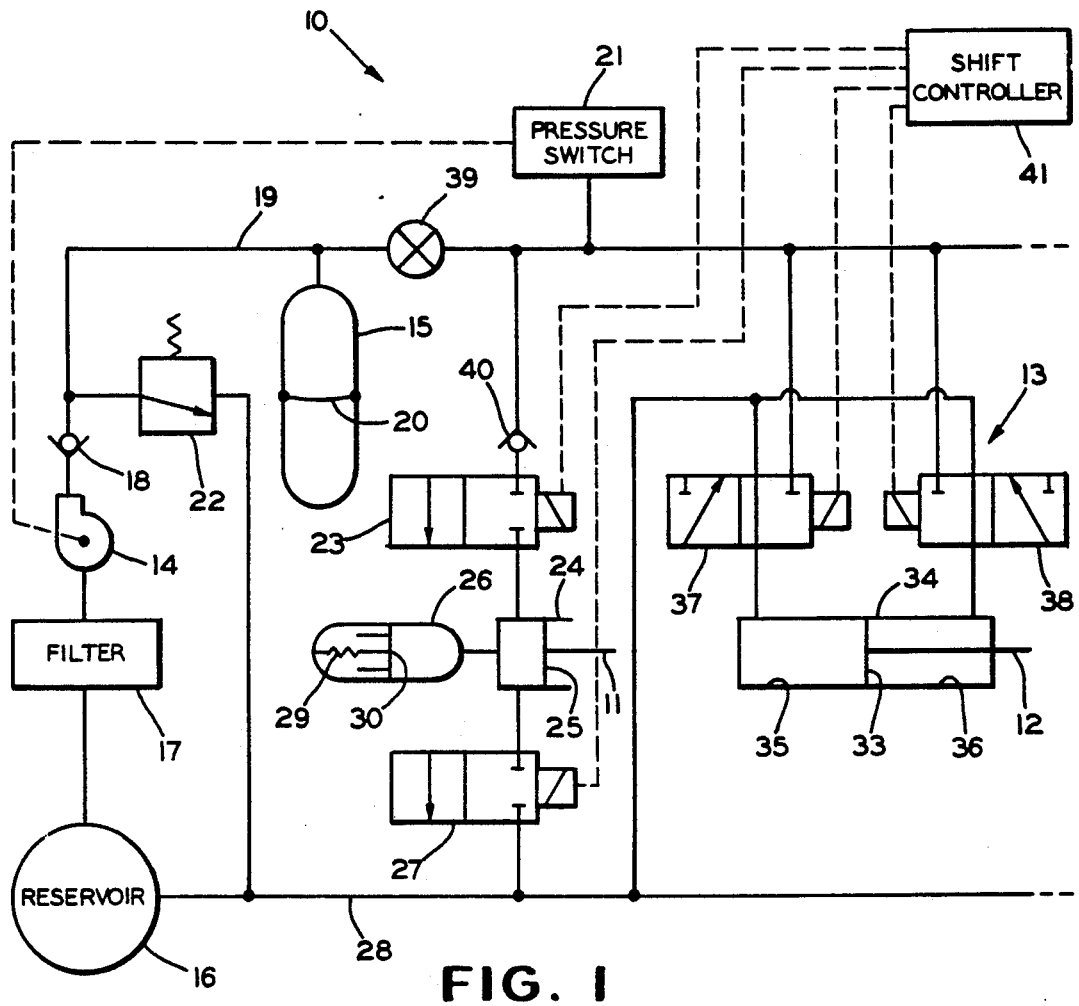
FIG. 1 is a schematic circuit diagram for a hydraulic system for operating a clutch and shift mechanism for a vehicle transmission.

Referring to the FIG. 1, a schematic circuit diagram is shown for a hydraulic system 10 according to the invention for operating a clutch actuating rod 11 and a plurality of gear shifting rails (one gear shifting rail 12 is shown) in a shift mechanism 13 for a vehicle transmission (not shown). An electrically driven pump 14 and a primary accumulator 15 supply the required flow of pressurized hydraulic fluid at a predetermined high pressure, or within a predetermined high pressure range. The pump 14 draws hydraulic fluid from a reservoir 16 through a filter 17 and delivers such fluid through a check valve 18 and a line 19 to the accumulator 15. The accumulator 15 is partially filled with an inert gas such as nitrogen and may have a piston or a diaphragm 20 separating the gas from the hydraulic fluid. As fluid is delivered to the accumulator 15, the gas is compressed to maintain a pressure on the fluid. In the example herein, the gas in the accumulator 15 is charged to a pressure of 350 psig prior to introducing fluid into the accumulator 15. Consequently, the fluid pressure must exceed 350 psig before it enters the accumulator 15. A pressure switch 21 is connected to the line 19. The pressure switch 21 closes a circuit when the pressure in the line 19 drops below a predetermined minimum level, such as 400 psig, and opens the circuit when the pressure in the line 19 rises above a predetermined maximum level, such as 500 psig. The pressure switch 21 is connected to control power to the pump 14. Consequently, when the pressure in the line 19 drops to 400 psig, the pump 14 is turned on and fluid flows into the accumulator 15 until a pressure of 500 psig is reached, whereupon the pump 14 is turned off. A high pressure relief valve 22 is shown connected from the line 19 to the reservoir 16. In the event that the switch 21 fails and the pump 14 remains on, the relief valve 22 opens to vent excessive fluid pressure to the reservoir 16.

In order to provide a long operating life for the pump 14, the pump 14 is operated at a low duty cycle. The capacity of the pump 14 and the capacity of the accumulator 15 are selected such that during maximum hydraulic fluid consumption from repetitive shifting sequences, the pump 14 operates at a maximum duty cycle of about 20%. As the gear shifting frequency is reduced and therefore the fluid consumption is reduced, the duty cycle also will reduce. When shifting is not taking place, there is minimum fluid leakage through the various hydraulic valves in the system 10 and consequently the pump 14 will remain off for long periods of time. The check valve 18 prevents pressure loss through the pump 14 while the pump 14 is off. Optionally, a normally closed poppet valve 39 may be inserted in the line 19 adjacent the accumulator 15 to isolate the clutch and gear shifting valves in the system 10 from the accumulator 15 during times between shifts. This prevents fluid pressure loss from any leakage through the valves.

The pressurized fluid line 19 is connected through a normally closed solenoid actuated valve 23 to deliver fluid to a hydraulic cylinder 24 in which a piston 25 is located to position the clutch actuating rod 11. A secondary accumulator 26 also is connected to the cylinder 24. The cylinder 24 further is connected through a normally closed solenoid actuated valve 27 and a fluid return line 28 to the reservoir 16. The secondary accumulator 26 has an internal spring 29 which acts on a piston 30.

The diameter of the piston 30, the force exerted by the spring 29 on the piston 30 when the accumulator 26 is full of hydraulic fluid, and the diameter of the clutch actuating piston 25 are selected to match the force required to operated the clutch actuating rod 11 to overcome the force of the clutch springs (not shown) For the following example, assume that a minimum force of 293 pounds is required to hold the clutch open and that the clutch actuating piston 25 has an area of 1.1781 in$^2$. Then the secondary accumulator 26 needs to establish a fluid pressure of 293 pounds/1.1781 in$^2$ or 249 psi on the fluid, when full. If the accumulator piston 30 has a diameter of 0.75 in or an area of 0.4418 in$^2$, then the spring 29 must exert a force of 249 psi×0.4418 in$^2$ or 110 pounds on the piston 30. Further, assume that the displacement of the cylinder 24 is 0.47 in$^3$ and that the displacement of the accumulator 26 is 0.40 in$^3$. Finally, assume that the valve 27 is a relative inexpensive, coarse valve which allows a minimum of about 14 drops or 0.042 in$^3$ of fluid flow through the valve 27 for the shortest modulation step.

Figure 2:
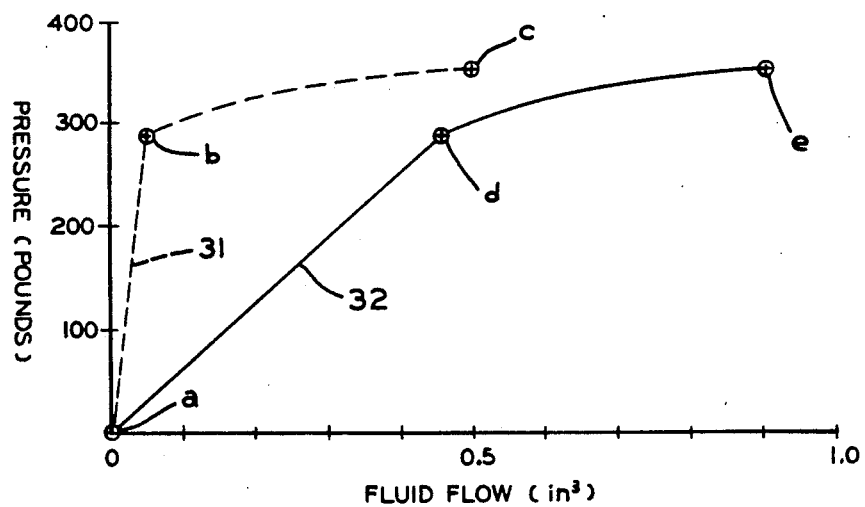
FIG. 2 is a graph illustrating operation of the clutch actuating cylinder.

Referring both to FIG. 1 and to the graph of FIG. 2, operation of the clutch actuating rod 11 will be described based on the above exemplary parameters. The dashed line 31 illustrates the operation of the clutch actuating rod 11 in the absence of the accumulator 26, as in the prior art. The piston 30 moves over the cylinder displacement of 0.40 in$^3$. When the valve 23 is opened, the clutch plates move from full contact at point a to light or "kissing" contact at point b over a short portion of the travel of the piston 30, and to full release at point c, where the cylinder 26 is filled with 0.47 in$^3$ of hydraulic fluid. When the valve 23 is closed and the valve 27 is modulated, the piston moves back along the line from points c to b to a and the clutch is reengaged. It takes about 11 modulation steps to go from point c to point a. There is no torque transfer through the clutch from points c to b and there is a sudden increase in the torque transfer from points b to a, which can be covered by a single modulation step of the coarse valve 27. In order to provide a smooth transition as the piston moves from b to a, the valve 27 must be a precision valve allowing a very small fluid flow (only a few drops at most) for each step.

When the accumulator 26 is connected to the cylinder 24, the operation of the clutch is illustrated by the solid line 32. From fully engaged to fully disengaged, the fluid flow-pressure curve moves from point a to point d, where the accumulator 26 is full of hydraulic fluid, the cylinder 24 contains only a small amount of fluid at point d and the clutch friction plates are kissing, and then moves to point e, where both the accumulator 26 and the cylinder 24 are full of hydraulic fluid. When the clutch is reengaged by pulse width modulation of the valve 27, the cylinder 24 is mostly emptied first until point d is reached About 9 valve modulation steps are required to empty the accumulator 26 and the remainder of the fluid in the cylinder 24. Consequently, the torque transfer through the clutch is smoothly increased with a coarse valve.

A check valve 40 may be located between the clutch disengaging valve 23 and the line 19 which supplies pressurized hydraulic fluid to the inlet side of the valve 23. In the event that there is a loss of fluid pressure at the source, for example, by a failure in the pressure line 19 and/or in the primary accumulator 15, the check valve 40 prevents a loss of pressure in the cylinder 24 and the secondary accumulator 26 until the valve 27 is opened.

Referring again to FIG. 1, the hydraulic system 10 also controls a plurality of gear shift rails, with the single rail 12 illustrated. The rail 12 is positioned by a piston 33 and a cylinder 34. Closed chambers 35 and 36 are formed in the cylinder 34 on opposite sides of the piston 33. A three way solenoid actuated valve 37 normally vents the chamber 35 to the fluid return line 28 and, when actuated, connects the chamber 35 to the pressurized fluid line 19. Similarly, a three way solenoid valve 38 normally vents the chamber 36 to the fluid return line 28 and, when actuated, connects the chamber 36 to the pressurized fluid line 19. When only the valve 37 is actuated, fluid delivered to the chamber 35 causes the gear shifting rail 12 to move to the right in FIG. 1, and when only the valve 38 is actuated, fluid delivered to the chamber 36 causes the gear shifting rail 12 to move to the left in FIG. 1. When both valves 37 and 38 are actuated, the gear shifting rail 12 is moved to a center position. For a 5 forward speed transmission, for example, there will be a total of 3 separate gear shifting rails. A programmed controller 41 is connected to operate the clutch valves 23 and 27, the valves 37 and 38 for controlling the gear shifting rail 12 and valves (not shown) for other gear shifting rails (not shown). Such controllers are known in the art and not considered a part of the present invention. They typically operate from feedback signals from shift position sensors and engine condition sensors, such as engine speed, intake manifold vacuum and throttle position sensors.

It will be appreciated that various modifications and changes may be made to the above described hydraulic clutch actuating and gear shifting system without departing from the spirit and the scope of the following claims. The hydraulic system also may operate other components in the transmission, such as a hill holder which prevents the vehicle from rolling backwards while the vehicle is stopped on a hill. In manual transmissions, the driver often partially engaged the clutch to hold the vehicle from rolling backwards while stopped on a hill. The hill holder is a clutch mechanism which prevents such rolling.

I claim:

1. A hydraulic system for operating a vehicle clutch comprising a source of hydraulic fluid having a predetermined high pressure, a hydraulic clutch release cylinder, a first normally closed valve connecting said source to said clutch release cylinder, a hydraulic fluid accumulator connected to said clutch release cylinder, said accumulator filling with hydraulic fluid at a predetermined intermediate pressure less than said predetermined high pressure, said clutch release cylinder and said accumulator receiving predetermined high pressure hydraulic fluid from said source to disengage the clutch when said first valve is opened, a normally closed second valve connected to vent hydraulic fluid from said clutch release cylinder and said accumulator when opened, and means for opening said first valve to disengage said clutch and for closing said first valve and for modulating said second valve to reengage said clutch.

2. A hydraulic system for operating a vehicle clutch, as set forth in claim 1, and wherein said clutch cylinder requires a predetermined minimum hydraulic pressure to disengage said clutch, and wherein said predetermined intermediate pressure is the predetermined minimum hydraulic pressure required by said clutch cylinder to disengage said clutch.

3. A hydraulic system for operating a vehicle clutch, as set forth in claim 1, and wherein said source of pressurized hydraulic fluid includes an electrically driven hydraulic fluid pump, a primary accumulator for receiving and storing pressurized hydraulic fluid from said pump, a check valve located between said pump and said primary accumulator, said check valve preventing a flow of hydraulic fluid from said primary accumulator to said pump, and pressure responsive switch means for turning on said pump when the fluid pressure at said primary accumulator drops below a predetermined minimum pressure greater than said predetermined intermediate pressure and for turning off said pump when the fluid pressure at said primary accumulator reaches a predetermined maximum pressure.

4. A hydraulic system for operating a vehicle clutch, as set forth in claim 3, and further including a second check valve located between said source of hydraulic fluid and said first valve, said second check valve preventing loss of fluid pressure from said clutch release cylinder in the event of a loss of fluid pressure from said source of hydraulic fluid.

5. A hydraulic pressure system for operating a clutch and transmission shifting mechanism, comprising an electrically driven hydraulic fluid pump, an accumulator for receiving and storing pressurized hydraulic fluid from said pump, a check valve located between said pump and said accumulator, said check valve preventing a flow of hydraulic fluid from said accumulator to said pump, pressure responsive switch means for turning on said pump when the fluid pressure at said accumulator drops below a predetermined minimum pressure and for turning off said pump when the fluid pressure at said accumulator reaches a predetermined maximum pressure, and means for operating the clutch and the transmission shifting mechanism with hydraulic fluid from said accumulator.

6. A hydraulic pressure system for operating a clutch and transmission shifting mechanism, as set forth in claim 5, and further including a pressure regulating valve connected across said pump, said regulating valve having a relief pressure greater than said predetermined maximum pressure to limit the hydraulic fluid pressure in the event of a failure of said pressure responsive switch means.

7. A hydraulic pressure system for operating a clutch and transmission shifting mechanism, as set forth in claim 5, wherein said accumulator and said fluid pump are of a size relative to the maximum fluid flow requirements of the clutch and transmission shifting mechanism to give said fluid pump a maximum duty cycle of 20%.

* * * * *